United States Patent
Herz

(10) Patent No.: US 6,874,160 B1
(45) Date of Patent: Mar. 29, 2005

(54) DIGITAL VIDEO RECORDER AND METHOD OF OPERATING THE SAME

(75) Inventor: William Samuel Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/428,643

(22) Filed: May 1, 2003

(51) Int. Cl.⁷ .................... H04N 5/445; H04N 7/16
(52) U.S. Cl. .................... 725/58; 725/58; 725/133; 725/141; 725/153
(58) Field of Search .................... 725/25, 35, 34, 725/36, 42, 51, 58, 141, 142, 151, 133, 14, 18, 20, 21, 83; 386/46, 55

(56) References Cited

U.S. PATENT DOCUMENTS

| | | | |
|---|---|---|---|
| 4,319,286 A | 3/1982 | Hanpachern | |
| 4,602,297 A | 7/1986 | Reese | |
| 4,750,052 A | 6/1988 | Poppy et al. | |
| 5,692,093 A | 11/1997 | Iggulden et al. | |
| 5,696,866 A | * 12/1997 | Iggulden et al. | 386/46 |
| 6,100,941 A | * 8/2000 | Dimitrova et al. | 348/700 |
| 6,167,188 A | * 12/2000 | Young et al. | 386/83 |
| 6,226,444 B1 | 5/2001 | Goldschmidt Iki et al. | |
| 6,271,892 B1 | * 8/2001 | Gibbon et al. | 348/700 |
| 6,317,882 B1 | * 11/2001 | Robbins | 725/34 |
| 6,351,596 B1 | 2/2002 | Ostrover | |
| 6,453,115 B1 | 9/2002 | Boyle | |
| 2003/0123850 A1 | * 7/2003 | Jun et al. | 386/68 |

\* cited by examiner

*Primary Examiner*—Thai Tran
*Assistant Examiner*—Jamie Vent
(74) *Attorney, Agent, or Firm*—Cooley Godward LLP

(57) ABSTRACT

A digital video recorder is described. In one embodiment, the digital video recorder includes a feature detector configured to derive a set of features from content within a television commercial. The digital video recorder also includes a television program identifier coupled to the feature detector. The television program identifier is configured to identify, using the set of features, a television program associated with the television commercial. The digital video recorder further includes a television program recorder coupled to the television program identifier. The television program recorder is configured to establish a recording session for the television program.

17 Claims, 3 Drawing Sheets

DIGITAL VIDEO RECORDER AND METHOD OF OPERATING THE SAME

BRIEF DESCRIPTION OF THE INVENTION

The present invention relates generally to recording television programs. More particularly, the present invention relates to recording a television program from a television commercial associated with the television program.

BACKGROUND OF THE INVENTION

A digital video recorder can record television programs for subsequent viewing by a user. Existing digital video recorders allow a user to overcome the rigid time schedule according to which television programs are typically broadcast. For example, an existing digital video recorder can be programmed to record a television program to allow viewing at a time that is more convenient for a user. In addition, existing digital video recorders often include a number of features that further enhance viewer experience. For example, certain digital video recorders include circular buffers that allow a user viewing a "live" broadcast of a television program to pause viewing at a certain point and, at a later time, resume viewing from that point.

Upon viewing a television commercial that advertises an upcoming television program, a user may wish to record the television program. However, with an existing digital video recorder, the user often has to undergo a tedious and lengthy process to record the television program. In particular, the user typically has to recognize the television program that is advertised and then manually program the digital video recorder to record the television program. To program the digital video recorder, the user often has to specify information regarding the television program, such as its television channel and broadcast time. If the user does not recall such information from memory, the user typically has to search a television program listing to identify such information. As a result of the large number of television programs that are broadcast on various television channels, searching for such information can be a difficult task.

It is against this background that a need arose to develop the apparatus and method described herein.

SUMMARY OF THE INVENTION

In one innovative aspect, the present invention relates to a digital video recorder. In one embodiment, the digital video recorder includes a feature detector configured to derive a set of features from content within a television commercial. The digital video recorder also includes a television program identifier coupled to the feature detector. The television program identifier is configured to identify, using the set of features, a television program associated with the television commercial. The digital video recorder further includes a television program recorder coupled to the television program identifier. The television program recorder is configured to establish a recording session for the television program.

In another innovative aspect, the present invention relates to a digital video recorder remote control apparatus. In one embodiment, the digital video recorder remote control apparatus includes a record command key and a control signal generator coupled to the record command key. The control signal generator is configured to generate a control signal in response to user engagement of the record command key. The control signal is configured to direct a digital video recorder to establish a recording session for a television program from a television commercial associated with the television program.

In a further innovative aspect, the present invention relates to a computer-readable medium. In one embodiment, the computer-readable medium includes instructions to recognize a set of features in a television commercial and instructions to generate, using the set of features, an identification of a television program associated with the television commercial. The computer-readable medium also includes instructions to record the television program based on the identification of the television program.

In yet a further innovative aspect, the present invention relates to a method of operating a digital video recorder. In one embodiment, the method includes coordinating a request to record a television program with a television commercial associated with the television program. The method also includes deriving a set of features from content within the television commercial and searching a list of television programs using the set of features to identify the television program. The method further includes establishing a recording session for the television program.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION

Figure 1:
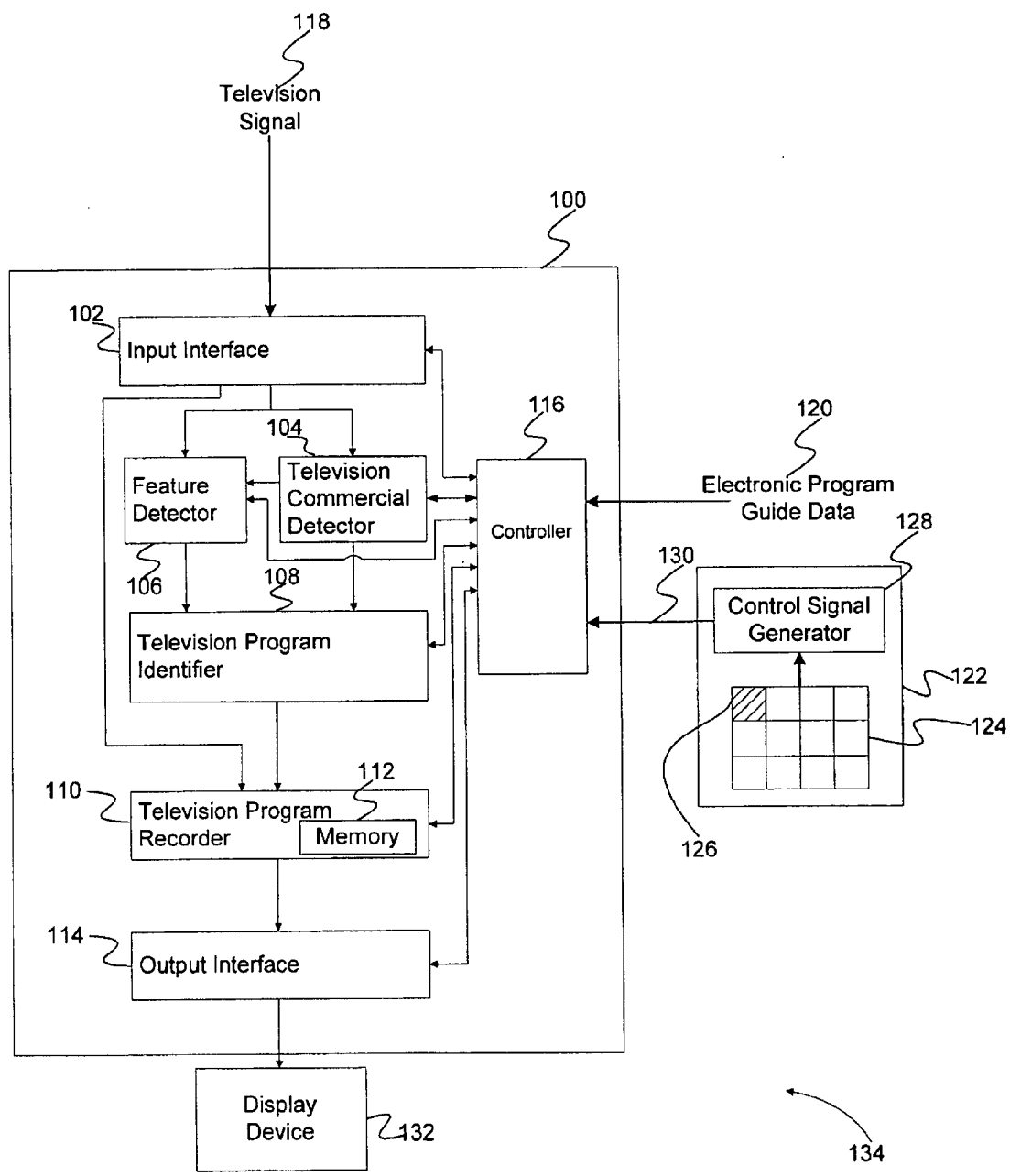
FIG. 1 illustrates an entertainment system that can be operated in accordance with an embodiment of the invention.

FIG. 1 illustrates an entertainment system 134 that can be operated in accordance with an embodiment of the invention. The entertainment system 134 includes a digital video recorder 100, a digital video recorder remote control apparatus 122, and a display device 132, such as, for example, a television set.

As shown in FIG. 1, the digital video recorder 100 includes a controller 116. The controller 116 receives electronic program guide data 120 via any wire or wireless connection, such as, for example, a phone line connection. The electronic program guide data 120 includes information regarding various television programs that can be received by the digital video recorder 100. In particular, the electronic program guide data 120 can indicate a number of attributes of the various television programs. Attributes of a television program can correspond to, for example, its name, television channel, broadcast time, plot summary, cast of characters, cast of actors, and so forth.

Referring to FIG. 1, the controller 116 is coupled to and directs the operation of various components of the digital video recorder 100, including an input interface 102, a television commercial detector 104, a feature detector 106, a television program identifier 108, a television program recorder 110, and an output interface 114.

The input interface 102 receives a television signal 118 via any wire or wireless connection. The input interface 102 can receive the television signal 118 from any of a number of sources, such as, for example, cable or satellite television networks or the Internet. Alternatively, or in conjunction, the input interface 102 can receive the television signal 118 in the form of radio frequency signals via an antenna (not shown in FIG. 1). The television signal 118 can carry a number of broadcast programs, such as television programs and television commercials. The broadcast programs can be associated with various television channels, and the input interface 102 can tune to a particular television channel to allow viewing of a desired broadcast program on the display device 132. It is also contemplated that the input interface 102 can be coupled to a set top box (not shown in FIG. 1), which can tune to a particular television channel and provide a tuned television signal to the input interface 102. While the television signal 118 and the electronic program guide data 120 are shown separately in FIG. 1, it is contemplated that the electronic program guide data 120 can be carried in the television signal 118.

Depending on the form of the television signal 118, the input interface 102 can perform signal processing operations to convert the television signal 118 into a form suitable for further processing by the digital video recorder 100. In the present embodiment of the invention, the television signal 118 can be initially provided as an analog signal, and the input interface 102 can digitize this analog signal. The input interface 102 can then encode the resulting digital signal using any of a number of conventional compression techniques to reduce memory requirements for recording operations. For example, the input interface 102 can encode the resulting digital signal using Moving Pictures Experts Group ("MPEG") compression techniques. It is also contemplated that the television signal 118 can be initially provided as a digital signal, and the input interface 102 can encode this digital signal using MPEG compression techniques.

With reference to FIG. 1, the digital video recorder 100 includes the television commercial detector 104, which is coupled to the input interface 102. During operation of the digital video recorder 100, the input interface 102 receives a television commercial that is carried in the television signal 118, and the television commercial detector 104 identifies the presence of the television commercial in the television signal 118. In the present embodiment of the invention, the television commercial detector 104 can operate in accordance with any of a number of conventional television commercial detection techniques, such as, for example, described in the patent to Dimitrova et al., entitled "Apparatus and Method for Locating a Commercial Disposed Within a Video Data Stream," U.S. Pat. No. 6,100,941, issued on Aug. 8, 2000; and the patent to Iggulden et al., entitled "Method and Apparatus for Eliminating Television Commercial Messages," U.S. Pat. No. 5,696,866, issued on Dec. 9, 1997, the disclosures of which are incorporated herein by reference in their entirety. For example, the television commercial detector 104 can identify the presence of the television commercial based on changes in a video portion of the television signal 118, such as associated with "black" frames, changes in an audio portion of the television signal 118, such as associated with durations of low volume, or both. As one of ordinary skill in the art will understand, such changes can be used to identify the starting and ending points of the television commercial. Upon identifying the presence of the television commercial, the television commercial detector 104 generates an indication of the presence of the television commercial to direct further processing of the television commercial. In particular, the television commercial detector 104 can provide this indication to either of, or both, the feature detector 106 and the television program identifier 108, which are coupled to the television commercial detector 104.

As shown in FIG. 1, the digital video recorder 100 includes the feature detector 106, which is coupled to the input interface 102. The feature detector 106 recognizes one or more features in the television commercial identified by the television commercial detector 104. A feature represents evidence of a television program that is associated with the television commercial. More particularly, a feature can correspond to an attribute of the television program that is associated with the television commercial. By way of example, the television commercial can advertise the television program and can indicate one or more attributes of the television program, such as, for example, its name or broadcast time. In the present embodiment of the invention, the feature detector 106 derives a set of features from content within the television commercial. Once the set of features is derived, the feature detector 106 provides the set of features to the television program identifier 108, which is coupled to the feature detector 106.

Using the set of features provided by the feature detector 106, the television program identifier 108 identifies the television program that is associated with the television commercial. In the present embodiment of the invention, the television program identifier 108 searches a representation of the electronic program guide data 120 using the set of features to identify the television program. To facilitate this search process, the television program identifier 108 desirably generates a list of television programs by deriving salient information from the electronic program guide data 120. The television program identifier 108 then searches the list of television programs using the set of features to identify the television program. Once the television program is identified, the television program identifier 108 generates an identification of the television program and provides this identification to the television program recorder 110, which is coupled to the television program identifier 108.

Upon receiving the identification of the television program from the television program identifier 108, the television program recorder 110 establishes a recording session for the television program. As shown in FIG. 1, the television program recorder 110 is coupled to the input interface 102. When the television program is broadcast, the input interface 102 tunes to a television channel associated with the television program, and the television program recorder 110 receives a signal associated with the television program from the input interface 102. In the present embodiment of the invention, the television program recorder 110 can receive an encoded digital signal associated with the television program from the input interface 102 and can provide this encoded digital signal to a memory 112 to record the television program. The memory 112 can be implemented using, for example, a hard disk drive. The memory 112 also can include a portion that operates as a circular buffer to provide temporary storage of broadcast programs.

As shown in FIG. 1, the digital video recorder 100 includes the output interface 114, which is coupled to the television program recorder 110 and to the display device 132. During viewing of the television program, the output interface 114 receives a signal associated with the television program from the television program recorder 110. In the present embodiment of the invention, the output interface 114 can receive an encoded digital signal associated with the television program from the television program recorder 110, and the output interface 114 can decode this encoded digital signal using any of a number of conventional decompression techniques, such as, for example, MPEG decompression techniques. The output interface 114 can then convert the decoded digital signal into a form suitable for display by the display device 132, such as, for example, in accordance with National Television Standards Committee ("NTSC") format or Phase Alternative Line ("PAL") format.

With reference to FIG. 1, a user can control the digital video recorder 100 using the digital video recorder remote control apparatus 122, which communicates with the controller 116 via any wire or wireless connection. In the present embodiment of the invention, the digital video recorder remote control apparatus 122 communicates with the controller 116 via a wireless connection that involves the transmission of control signals. As shown in FIG. 1, the digital video recorder remote control apparatus 122 includes a set of command keys 124, including a record command key 126, and a control signal generator 128 that is coupled to the set of command keys 124. Upon user engagement of a particular command key, the control signal generator 128 generates a control signal, such as, for example, an infrared light signal that is modulated with a particular command. The controller 116 then detects and processes the control signal to direct operation of various components of the digital video recorder 100 in accordance with the command. In the present embodiment of the invention, user engagement of the record command key 126 causes the control signal generator 128 to generate a control signal 130, which directs the digital video recorder 100 to record the television program from the television commercial as discussed above.

Advantageously, the present embodiment of the invention facilitates recording a television program from a television commercial that is associated with the television program. In particular, upon viewing a television commercial that advertises a television program, a user may wish to record the television program that is advertised. For example, the television commercial may advertise an upcoming broadcast of a television program, such as, for example, The Simpsons™, and the user may wish to record the television program for viewing at a time that is convenient for the user. In accordance with the present embodiment of the invention, the user need not undergo a tedious and lengthy process to record the television program. Rather, the user can simply engage the record command key 126 upon viewing the television commercial, and, in response, the digital video recorder 100 can identify the television program that is advertised and establish a recording session for the television program. When the television program is broadcast, the digital video recorder 100 tunes to a television channel associated with the television program and records the television program. Advantageously, the present embodiment of the invention can identify the television program from content within the television commercial. As a result, the present embodiment of the invention can generate an identification of the television program from the television commercial without requiring such an identification to be provided by a broadcast program source, such as embedded within a television signal carrying the television commercial in a satellite delivery system.

The foregoing discussion provides a general overview of an embodiment of the invention. Attention now turns to FIG. 2, which illustrates a flow chart for operating a digital video recorder (e.g., the digital video recorder 100) in accordance with an embodiment of the invention.

Figure 2:
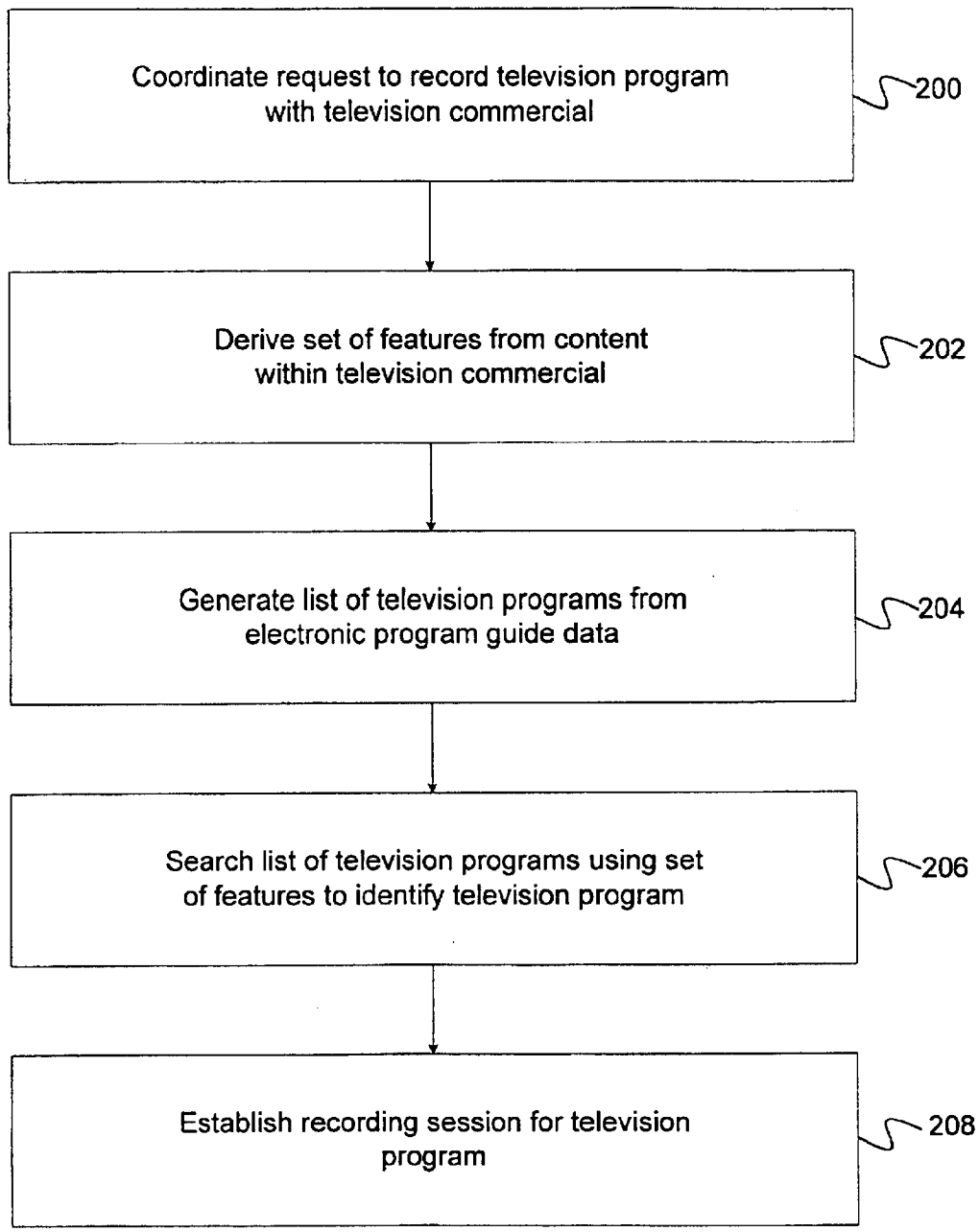
FIG. 2 illustrates a flow chart for operating a digital video recorder in accordance with an embodiment of the invention.

The first processing operation shown in FIG. 2 is to coordinate a request to record a television program with a television commercial associated with the television program (block 200). During operation of the digital video recorder, an input interface (e.g., the input interface 102) receives a television signal (e.g., the television signal 118) carrying the television commercial. While viewing the television commercial, a user may wish to record the television program that is associated with the television commercial. In the present embodiment of the invention, the user can control the operation of the digital video recorder using a digital video recorder remote control apparatus (e.g., the digital video recorder remote control apparatus 122). In particular, the user provides a request to record the television program by engaging a record command key (e.g., the record command key 126), which causes the digital video recorder remote control apparatus to generate a control signal (e.g., the control signal 130).

A controller (e.g., the controller 116) included in the digital video recorder detects and processes the control signal to direct the digital video recorder to record the television program. In particular, in response to the control signal, a television commercial detector (e.g., the television commercial detector 104) analyzes the television signal to identify the presence of the television commercial in the television signal. Upon identifying the presence of the television commercial, the television commercial detector provides an indication of the presence of the television commercial to direct further processing of the television commercial. To account for the processing time required to identify the presence of the television commercial, the television commercial can be stored in a memory (e.g., the memory 112) for subsequent access. In the event that the presence of the television commercial is not identified, the television commercial detector can provide an error indication that can be displayed on a display device (e.g., the display device 132).

With reference to FIG. 2, the second processing operation shown is to derive a set of features from content within the television commercial (block 202). In the present embodiment of the invention, a feature detector (e.g., the feature detector 106) derives the set of features from closed captioning data associated with the television commercial. Closed captioning data can represent dialog or narration associated with the television commercial and is typically included in a video portion of the television signal carrying the television commercial. Alternatively, or in conjunction, the feature detector can derive the set of features from audio data associated with the television commercial. Audio data can also represent dialog or narration associated with the television commercial and is typically included in an audio portion of the television signal carrying the television commercial. By way of example, the television commercial can advertise the television program and can include closed captioning data or audio data that indicate one or more attributes of the television program, such as, for example, its name or broadcast time. In this example, the feature detector can derive the set of features to correspond to one or more attributes of the television program.

To facilitate subsequent identification of the television program, it is contemplated that the feature detector can analyze a particular portion or portions of the closed captioning data or audio data when deriving the set of features. For example, the television commercial that advertises the television program may likely refer to a distinctive attribute of the television program, such as its name, in a beginning or ending segment of the television commercial. Accordingly, the feature detector can target its analysis to a portion of the closed captioning data or audio data that is associated with such beginning or ending segment. It is contemplated that such beginning or ending segment can be identified by the television commercial detector, which can then provide an indication of such beginning or ending segment to the feature detector.

The third processing operation shown in FIG. 2 is to generate a list of television programs from electronic program guide data (e.g., the electronic program guide data 120) (block 204). In the present embodiment of the invention, a television program identifier (e.g., the television program identifier 108) generates the list of television programs by deriving attributes of various television programs from the electronic program guide data, such that the list of television programs indicates one or more attributes of each of the various television programs. Desirably, the attributes indicated in the list of television programs form a subset of the information included in the electronic program guide data and are selected to allow the television program identifier to quickly and accurately identify the television program by searching the list of television programs. In particular, the list of television programs can indicate one or more distinctive attributes of each of the various television programs. For certain applications, the list of television programs can simply indicate names of the various television programs. For other applications, the list of television programs can indicate different or additional attributes of the various television programs.

In the present embodiment of the invention, the television program identifier can generate the list of television programs prior to receiving the request to record the television program, which list of television programs can be stored in a memory (e.g., the memory 112) for subsequent access. Such prior generation of the list of television programs serves to reduce the amount of time required to identify the television program upon receiving the request to record the television program. This, in turn, allows an identification of the television program to be timely displayed to the user and the user to timely enter commands regarding the identification. However, it is contemplated that the television program identifier can generate the list of television programs subsequent to receiving the request to record the television program.

To reduce interference with other operations of the digital video recorder, such as those involving memory access, the television program identifier can generate the list of television programs during a time interval when the digital video recorder is not processing user commands. For example, the television program identifier can generate the list of television programs at nighttime or during any other time interval when the user is not operating the digital video recorder. From time to time, the television program identifier can generate a new list of television programs or update a previous list of television programs upon receiving updated electronic program guide data via, for example, a phone line connection.

The fourth processing operation shown in FIG. 2 is to search the list of television programs using the set of features to identify the television program (block 206). In the present embodiment of the invention, the television program identifier compares the set of features derived from the television commercial with attributes of the various television programs indicated in the list of television programs. Upon determining that an adequate match exists between the set of features and one or more attributes of the television program, the television program identifier generates an identification of the television program.

In the present embodiment of the invention, the identification of the television program can be displayed on the display device. Preferably, the identification is displayed while the user is still viewing the television commercial or shortly after the user finishes viewing the television commercial. In response, the user can enter commands regarding the identification using the digital video recorder remote control apparatus. In particular, the user can enter a confirmation regarding the identification to record the television program.

In certain situations, the television program identifier can search the list of television programs using the set of features to identify a set of television programs. In particular, the television program identifier can identify a number of potential matches based on the set of features. For such situations, the television program identifier can select one or more of the television programs to be recorded in accordance with any of a number of selection criteria. In particular, the television program identifier can identify a set of television channels associated with the set of television programs and can select a television program from the set of television programs based on a television channel associated with the television program. For example, the television program identifier can select a television program that is associated with the same television channel as the television commercial. As another example, the television program identifier can select a television program that is associated with a television channel receivable by the digital video recorder. It is also contemplated that the set of television programs can be indicated on the display device, and the user can enter commands to select one or more television programs to be recorded using the digital video recorder remote control apparatus.

The fifth processing operation shown in FIG. 2 is to establish a recording session for the television program (block 208). In the present embodiment of the invention, a television program recorder (e.g., the television program recorder 110) receives the identification of the television program from the television program identifier and establishes a recording session for the television program based on this identification. The television program recorder can establish the recording session in accordance with any of a number of conventional recording techniques. For example, the television program recorder can analyze the electronic program guide data to identify a broadcast time and television channel associated with the television program. At the broadcast time, the input interface tunes to the television channel to allow the television program recorder to record the television program.

Figure 3:
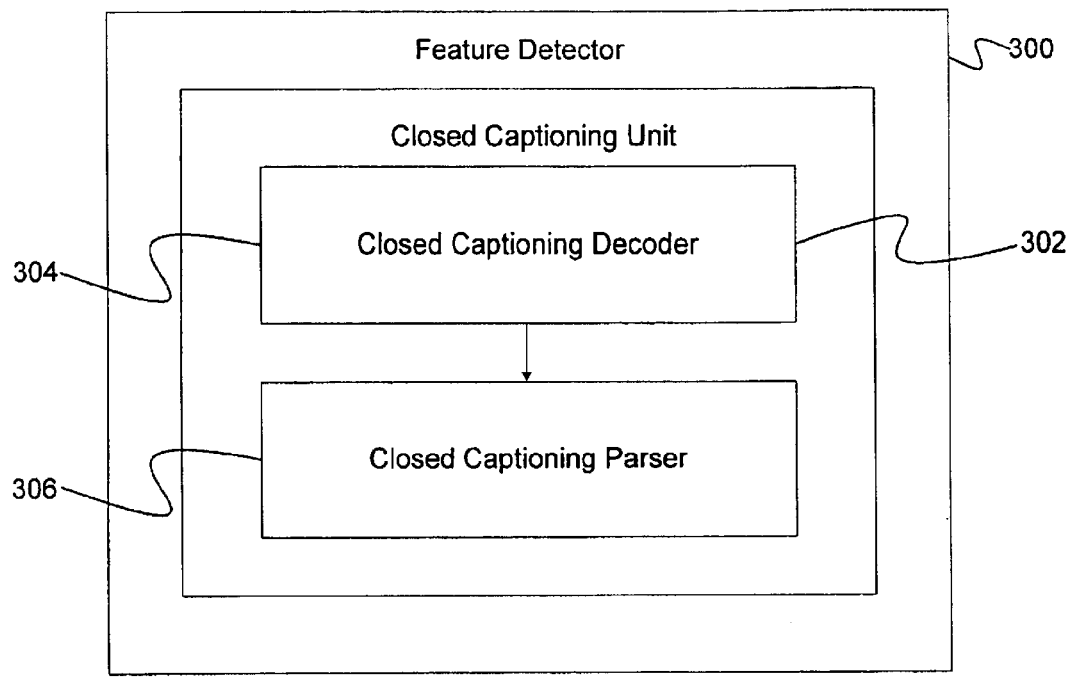
FIG. 3 illustrates a feature detector that can be incorporated in a digital video recorder, according to an embodiment of the invention.

Referring next to FIG. 3, a feature detector 300 that can be incorporated in a digital video recorder (e.g., the digital video recorder 100) is illustrated, according to an embodiment of the invention. In the present embodiment of the invention, the feature detector 300 includes a closed captioning unit 302. The closed captioning unit 302 derives a set of features from closed captioning data associated with a television commercial.

As shown in FIG. 3, the closed captioning unit 302 includes a closed captioning decoder 304 and a closed captioning parser 306 that is coupled to the closed captioning decoder 304. The closed captioning decoder 304 identifies the closed captioning data associated with the television commercial and provides the closed captioning data in a form suitable for processing by the closed captioning parser 306. In the present embodiment of the invention, the closed captioning decoder 304 can provide the closed captioning data in an American Standard Code for Information Interchange ("ASCII") format for processing by the closed captioning parser 306.

The closed captioning parser 306 analyzes the closed captioning data in the ASCII format to derive a set of features. In the present embodiment of the invention, the closed captioning parser 306 can operate in accordance with any of a number of conventional techniques for parsing data. For example, the closed captioning parser 306 can identify various words represented in the closed captioning data. The closed captioning parser 306 can perform word stemming or rooting to remove redundant words and also word filtering to remove generic or frequently occurring words, such as, for example, articles, pronouns, and prepositions. As a result, the closed captioning parser 306 derives a set of non-trivial words that can correspond to one or more attributes of a television program that is associated with the television commercial.

Figure 4:
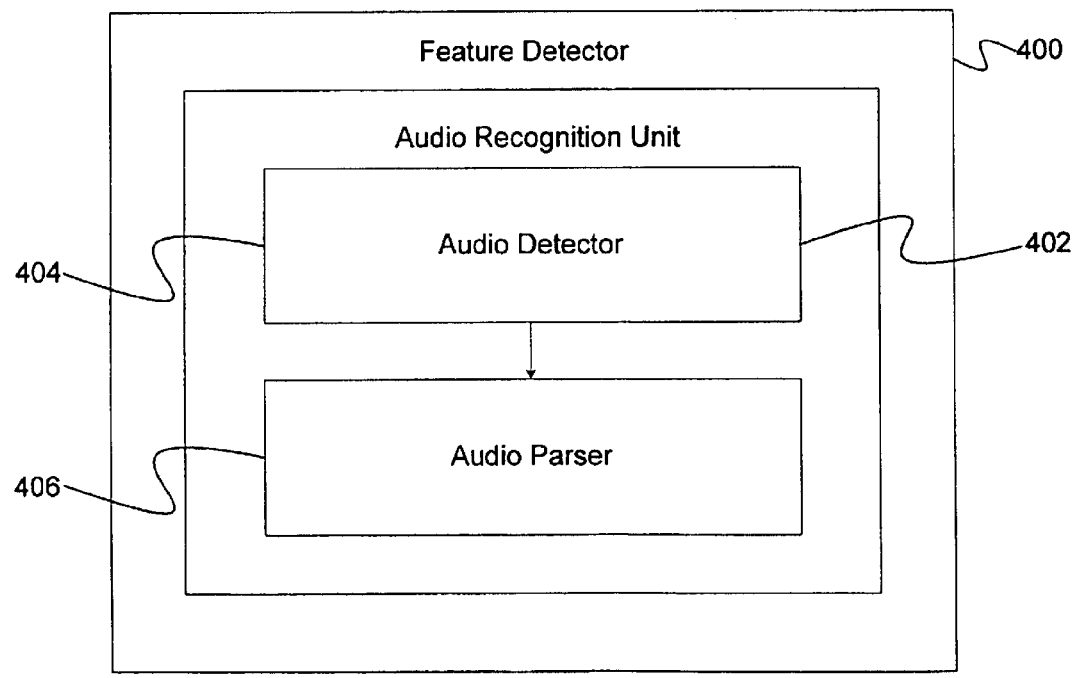
FIG. 4 illustrates a feature detector that can be incorporated in a digital video recorder, according to another embodiment of the invention.

FIG. 4 illustrates a feature detector 400 that can be incorporated in a digital video recorder (e.g., the digital video recorder 100), according to another embodiment of the invention. In the present embodiment of the invention, the feature detector 400 includes an audio recognition unit 402. The audio recognition unit 402 is configured to derive a set of features from audio data associated with a television commercial.

As shown in FIG. 4, the audio recognition unit 402 includes an audio detector 404 and an audio parser 406 that is coupled to the audio detector 404. The audio detector 404 identifies audio data associated with the television commercial and provides the audio data in a form suitable for processing by the audio parser 406. In the present embodiment of the invention, the audio detector 404 can operate in accordance with any of a number of conventional voice recognition techniques to identify audio data and can provide the audio data in an ASCII format for processing by the audio parser 406.

The audio parser 406 analyzes the audio data in the ASCII format to derive a set of features. In the present embodiment of the invention, the audio parser 406 can operate in a similar manner as the closed captioning parser 306 discussed in connection with FIG. 3.

It should be recognized that the specific embodiments of the invention discussed above are merely exemplary, and various other embodiments are encompassed by the present invention.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools.

Another embodiment of the invention may be implemented in hardwired circuitry in place of, or in combination with, machine-executable software instructions. For example, with reference to FIG. 1, the various components of the digital video recorder 100 may be implemented using hardwired circuitry, machine-executable software instructions, or a combination thereof.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

What is claimed is:

1. A digital video recorder, comprising:
   a feature detector configured to derive a set of features by parsing at least one of dialog and narration associated with a television commercial, wherein said set of features includes at least one of:
      a name of a television program associated with said television commercial; and
      a broadcast time of said television program;
   a television program identifier coupled to said feature detector, said television program identifier being configured to search a list of television programs using said set of features to identify said television program without requiring an identification code to be provided with said television commercial; and
   a television program recorder coupled to said television program identifier, said television program recorder being configured to establish a recording session for said television program.

2. The digital video recorder of claim 1, further comprising:
   a television commercial detector coupled to said feature detector, said television commercial detector being configured to identify said television commercial in a television signal.

3. The digital video recorder of claim 1, wherein said feature detector includes:
   a closed captioning unit configured to derive said set of features from closed captioning data representing at least one of said dialog and said narration associated with said television commercial.

4. The digital video recorder of claim 1, wherein said feature detector includes:
   an audio recognition unit configured to derive said set of features from audio data representing at least one of said dialog and said narration associated with said television commercial.

5. The digital video recorder of claim 1, wherein said television program identifier is configured to search said list of television programs using said set of features to identify a set of television programs, said television program identifier being further configured to select said television program from said set of television programs based on a television channel associated with said television program.

6. The digital video recorder of claim 1, wherein said television program identifier is configured to generate said list of television programs from electronic program guide data.

7. A computer-readable medium, comprising:
instructions to recognize a set of features in content within a television commercial, wherein said set of features includes at least one of:
a name of a television program associated with said television commercial; and
a broadcast time of said television program;
instructions to generate, using said set of features in said content, an identification of said television program, wherein said instructions to generate said identification of said television program include instructions to search a list of television programs using said set of features to identify said television program without requiring an identification code to be provided with said television commercial; and
instructions to record said television program based on said identification of said television program.

8. The computer-readable medium of claim 7, wherein said instructions to recognize said set of features include:
instructions to derive said set of features from closed captioning data representing at least one of dialog and narration associated with said television commercial.

9. The computer-readable medium of claim 7, wherein said instructions to generate said identification of said television program further include:
instructions to generate said list of television programs from electronic program guide data.

10. A method of operating a digital video recorder, comprising:
coordinating a request to record a television program with a television commercial associated with said television program;
deriving a set of features from at least one of dialog and narration associated with said television commercial;
generating a list of television programs from electronic program guide data;
searching said list of television programs using said set of features to identify said television program; and
establishing a recording session for said television program.

11. The method of claim 10, wherein deriving said set of features includes:
deriving said set of features from closed captioning data representing at least one of said dialog and said narration associated with said television commercial.

12. The method of claim 10, wherein deriving said set of features includes:
deriving said set of features from audio data representing at least one of said dialog and said narration associated with said television commercial.

13. The method of claim 10, wherein searching said list of television programs includes identifying a set of television programs, the method further comprising:
identifying a television channel associated with said television program; and
selecting said television program from said set of television programs based on said television channel.

14. The method of claim 10, wherein searching said list of television programs includes identifying a set of television programs, the method further comprising:
receiving a user-specified selection of said television program from said set of television programs.

15. The method of claim 10, wherein generating said list of television programs includes:
prior to coordinating said request, generating said list of television programs from said electronic program guide data during a time interval when said digital video recorder is not processing user commands.

16. The method of claim 10, wherein generating said list of television programs includes:
subsequent to coordinating said request, generating said list of television programs from said electronic program guide data during a time interval when said digital video recorder is not processing user commands.

17. The method of claim 10, wherein deriving said set of features includes:
deriving said set of features by parsing at least one of said dialog and said narration associated with said television commercial.

* * * * *